(12) United States Patent
Haller et al.

(10) Patent No.: US 7,407,714 B2
(45) Date of Patent: *Aug. 5, 2008

(54) PROCESS BY PRODUCING AN ALUMINIUM ALLOY BRAZING SHEET, ALUMINIUM ALLOY BRAZING SHEET

(75) Inventors: Scott W. Haller, Richmond, VA (US); Job Anthonius Van Der Hoeven, Haarlem (NL); Klaus Vieregge, Nauort (DE); Achim Bürger, Hoehr-Grenzhausen (DE); Sampath Desikan, Koblenz (DE)

(73) Assignees: Aleris Aluminum Koblenz GmbH, Koblenz (DE); Aleris Aluminum Canada S.E.C., Cap-de-la-Madeleine (Quebec) (CA)

( * ) Notice: Subject to any disclaimer, the term of this patent is extended or adjusted under 35 U.S.C. 154(b) by 246 days.

This patent is subject to a terminal disclaimer.

(21) Appl. No.: 11/136,725

(22) Filed: May 25, 2005

(65) Prior Publication Data

US 2006/0014043 A1    Jan. 19, 2006

Related U.S. Application Data

(60) Provisional application No. 60/580,348, filed on Jun. 18, 2004.

(30) Foreign Application Priority Data

May 26, 2004  (EP) .................................. 04076545
Jun. 18, 2004  (EP) .................................. 04076785
Sep. 23, 2004  (EP) .................................. 04077623

(51) Int. Cl.
  *B32B 15/20* (2006.01)
  *B23K 35/22* (2006.01)
  *C22F 1/00* (2006.01)
  *C22C 21/00* (2006.01)

(52) U.S. Cl. ........................ 428/654; 148/437; 148/439; 148/535; 420/535; 228/262.5; 165/905

(58) Field of Classification Search ...................... None
See application file for complete search history.

(56) References Cited

U.S. PATENT DOCUMENTS

| 6,019,939 | A | 2/2000 | Gray et al. |
| 6,352,789 | B1 * | 3/2002 | Hurd et al. .................. 428/654 |
| 7,226,669 | B2 * | 6/2007 | Benedictus et al. ......... 428/654 |
| 2001/0007720 | A1 * | 7/2001 | Soga et al. .................. 428/654 |
| 2001/0010866 | A1 * | 8/2001 | Sontgerath et al. .......... 428/654 |
| 2005/0064226 | A1 * | 3/2005 | Benedictus et al. ......... 428/654 |

FOREIGN PATENT DOCUMENTS

| EP | 0718072 | 6/1996 |
| EP | 1291165 | 3/2003 |
| WO | WO 94/22633 | 10/1994 |
| WO | 0240729 | 5/2002 |

OTHER PUBLICATIONS

M. Nylén et al., "The Mechanism of Braze Metal Penetration by Migration of Liquid Films in Aluminum", Material Science Forum, Trans Tech Publications, No. 331-337, 2000, pp. 1737-1742, XP008043730 Switzerland the whole document.

A. Wittebrood et al., "Grain Boundary Melting or Liquid Film Migration in Brazing Sheet" Material Science Forum, Trans Tech Publications, No. 331-337, 2000, pp. 1743-1750, XP008043731 Switzerland the whole document.

* cited by examiner

*Primary Examiner*—John J Zimmerman
(74) *Attorney, Agent, or Firm*—Novak Druce + Quigg, LLP

(57) ABSTRACT

Disclosed is a process for producing an Al—Mn alloy sheet with improved liquid film migration resistance when used as core alloy in brazing sheet, including the steps of: casting an ingot having a composition comprising (in weight percent): $0.5 < Mn \leq 1.7$, $0.06 < Cu \leq 1.5$, $Si \leq 1.3$, $Mg \leq 0.25$, $Ti < 0.2$, $Zn \leq 2.0$, $Fe \leq 0.5$, at least one element of the group of elements of $0.05 < Zr \leq 0.25$ and $0.05 < Cr \leq 0.25$; other elements $<0.05$ each and total $<0.20$, balance Al; homogenisation and preheat; hot rolling; cold rolling (including intermediate anneals whenever required), and wherein the homogenisation temperature is at least 450° C. for a duration of at least 1 hour followed by an air cooling at a rate of at least 20° C./h and wherein the pre-heat temperature is at least 400° C. for at least 0.5 hour.

29 Claims, No Drawings

PROCESS BY PRODUCING AN ALUMINIUM ALLOY BRAZING SHEET, ALUMINIUM ALLOY BRAZING SHEET

CROSS REFERENCE TO RELATED APPLICATIONS

This claims the benefit of European Patent application no. 04076545.5, filed on May 26, 2004, European Patent application no. 04076785.7, filed on Jun. 18, 2004; European Patent application no. 04077623.9, filed on Sep. 23, 2004; and U.S. provisional patent application No. 60/580,348 filed Jun. 18, 2004, all incorporated herein by reference in their entirety.

FIELD OF THE INVENTION

The invention relates to a process for producing an Al—Mn alloy sheet with improved liquid film migration resistance when used as core alloy in brazing sheet materials. The invention further relates to an Al—Mn alloy sheet produced according to the process and to the use of the alloy sheet.

BACKGROUND OF THE INVENTION

In brazing applications, the phenomenon known as 'Liquid Film Migration' or LFM, causes a deterioration in the overall performance of brazed products such as evaporators, radiators, heater cores etc. In literature the term "LFM" is also referred to as "core dissolution" or "core penetration" or "core erosion". Herein by the term "LFM" we refer to all these terminologies. Although the exact mechanism causing LFM is not yet fully understood, it appears that the severity of LFM is enhanced by the presence of a certain amount of dislocations in the core alloy of the brazing sheet. It is known that the sensitivity of a material to LFM is relatively low in both, fully annealed (O-temper) and in strain hardened and/or stress relieved tempers (such as for example H14, H24 etc) as compared to the soft and slightly cold worked condition of the same material. By the term "slight cold working", we refer to the deformation resulting from industrial processes such as stamping, roll forming or tension levelling which are typically applied to produce components of heat exchangers such as evaporator or oil cooler core plates, folded tubes etc. When a brazing sheet consisting of a core alloy and an Al—Si clad alloy is deformed to form a product and is subsequently subjected to a brazing cycle, the small amount of deformation appears to be sufficient to induce LFM in the brazing sheet. If the LFM progresses too far into the core alloy, then the brazeability, strength and the corrosion resistance decreases. It is known that alloying elements, which retard recrystallisation, such as chromium, zirconium and vanadium enhance the susceptibility to LFM. Manganese dispersoïds are also known to retard recrystallisation and therefore to enhance the susceptibility to LFM. The amount and size of the manganese dispersoïds depend on the processing route of the brazing sheet.

For brazing applications, a core alloy of a brazing sheet product requires a good combination of strength and formability. Obviously, the susceptibility to LFM has to be at a sufficiently low level to ensure adequate corrosion resistance and brazeability. Higher strength can be obtained by alloying with elements such as silicon, manganese, chromium, zirconium or vanadium. However, these alloying elements also increase the susceptibility to LFM. The use of a non O-temper, such as H14-temper or H24-temper has also been suggested to reduce the susceptibility to LFM. However, although these tempers effectively reduce the LFM, formability of the brazing sheet product is often compromised. Other alternative processes such light cold deforming process such as tension levelling, or the use of a non-recrystallised surface layer are difficult to control in mass-production practice and therefore may compromise reproducibility and/or formability.

SUMMARY OF THE INVENTION

It is an object of the invention to provide a process for producing an Al—Mn alloy sheet with improved liquid film migration resistance when used as core alloy in brazing sheet wherein a good strength/formability combination of the alloy is combined with a sufficiently low susceptibility to LFM and adequate corrosion resistance.

It is also an object to provide a process to produce the Al—Mn alloy sheet, which is easy to control and results in a reproducible product.

It is also an object of the invention to provide an Al—Mn alloy sheet with improved liquid film migration resistance in folded tubes, evaporator or oil cooler core plates, fin stocks etc., wherein a good strength/formability combination of the alloy is combined with a sufficiently low susceptibility to LFM, good brazeability and adequate corrosion resistance.

According to the invention, one or more of the objects is reached with a process for producing an Al—Mn alloy sheet with improved liquid film migration resistance when used as core alloy in brazing sheet, comprising the steps of:

Casting a composition comprising (in weight percent):
  $0.5 < Mn \leq 1.7$, preferably 0.6-1.7,
  $0.06 < Cu \leq 1.5$, preferably 0.2 to 1.5,
  $Si \leq 1.3$, preferably $Si \leq 0.8$, more preferably $Si \leq 0.3$,
  $Mg \leq 0.25$
  $Ti < 0.2$
  $Zn \leq 2.0$
  $Fe \leq 0.5$
  at least one element of the group of elements consisting of $0.05 < Zr \leq 0.25$ and $0.05 < Cr \leq 0.25$
  other elements<0.05 each and total<0.20, balance Al;
homogenisation and preheat;
hot rolling;
cold rolling (including intermediate anneals whenever required);
wherein the homogenisation temperature is at least 450° C. for a duration of at least 1 hour followed by an air cooling at a rate of at least 20° C./hour and wherein the pre-heat temperature is at least 400° C. for at least 0.5 hour.

Casting takes place using regular production techniques such as DC casting or continuous casting.

The process according to the invention enables production of an Al—Mn alloy which, when used as core alloy in brazing sheet, couples a good strength/formability combination to a sufficiently low susceptibility to LFM and an adequate corrosion resistance. The inventors surprisingly found that, although chromium is reported to have an adverse effect on the susceptibility to LFM because of the retarding effect it has on the recrystallisation of the alloy, the combination of the chemistry of the alloy and the process parameters, particularly the homogenisation and preheat process, results in a product with a sufficiently low susceptibility to LFM and hence adequate corrosion resistance. The Cr-containing and/or Zr-containing precipitates, which are formed in the alloy as a result of the combination of composition and processing conditions, reduce the susceptibility to LFM. Also the chromium strengthens the alloy, whereas the recrystallisation of the alloy results in adequate formability. The inventors found that similar results can be obtained by alloying with V or by alloying with a combination of V with Cr and/or Zr. Thus if desired, the Cr and/or Zr may be replaced by V. The range for V, if present, is 0 to 0.25, typically 0.05 to 0.25 wt. %. Typically the sum of Cr+Zr+V is 0.05 to 0.25 wt. %.

DETAILED DESCRIPTION OF THE PREFERRED EMBODIMENTS

In an embodiment of the invention, the Cr and/or Zr content is at least 0.08%. The inventors found that when using a chromium content of at least 0.08% or a zirconium content of at least 0.08% or the combination thereof in combination with the described process conditions resulted in a higher strength in combination with adequate LFM-resistance.

In an embodiment of the invention, the maximum magnesium content is 0.1%, preferably the maximum magnesium content is 0.05%. The magnesium content should be as low as possible to avoid the deleterious effect of magnesium on the flux that is used during Controlled Atmosphere Brazing. In an embodiment of the invention the copper content is from 0.7 to 1.2%.

In an embodiment of the invention the manganese content is from 0.7 to 1.4%. If the manganese content exceeds 1.4% difficulties in fabrication increase and below 0.7% the strength of the alloy is insufficient. In an embodiment of the invention the maximum zinc content is preferably 0.4% to prevent the core alloy being excessively anodic in certain applications. In an embodiment of the invention the iron content is preferably below 0.35% to prevent the formation of undesirable large iron containing intermetallics during industrial casting practices.

In an embodiment of the invention, the homogenisation temperature is between about 530° C. and 620° C., preferably between 530 and 595° C., preferably for between 1 to 25 hours, more preferably for between 10 to 16 hours, and wherein the pre-heat temperature is between about 400° C. and 530° C., preferably between 420 and 510° C., preferably for between 1 to 25 hours, more preferably for between 1 and 10 hours. In the alloys according to the invention, it appears that the best compromise between the strength, formability, susceptibility to LFM and corrosion resistance was found when the homogenisation temperature and time and the pre-heat temperature and time was chosen within the given boundaries and that a particularly interesting compromise was obtained when processing the alloy according to the abovementioned preferred temperatures and times.

It is known to the skilled person that time and temperature of an annealing are usually not chosen independently. Most relevant metallurgical processes are thermally activated, resulting in the situation that a high temperature coupled with a short time may have the same result as a lower temperature and a longer time.

The process according to the invention also comprises recrystallisation annealing after cold rolling at an annealing temperature-annealing time combination sufficient for promoting essentially full recrystallisation of the Al—Mn alloy. In this condition the highest formability is reached.

In an embodiment of the invention the maximum silicon content of the Al—Mn alloy is 0.3% in weight. In a preferable embodiment of the invention the maximum silicon content of the Al—Mn alloy is 0.15% in weight. Silicon is known to increase the susceptibility to LFM. Consequently, the silicon content is to be chosen as low as possible. However, the inventors found that when using a silicon content of up to 0.3% but preferably of up to 0.15% that an adequate combination of susceptibility to LFM and strength was obtained.

In an embodiment of the invention Cr≦0.18%, preferably at least 0.06%, more preferably 0.08%<Cr≦0.15%, even more preferably 0.08%<Cr≦0.12%. When the Cr-level exceeds 0.18%, casting of the Al—Mn alloy becomes very difficult as a result of the formation of large intermetallics. Casting the Al—Mn with Cr-contents of below 0.15% or below 0.12 causes no problems. By adding at least 0.08% of Cr, the effect thereof on the susceptibility to LFM in combination with the described process conditions results in an adequate combination of susceptibility to LFM and strength. The precipitates, which are formed in the alloy as a result of the combination of composition and processing conditions, reduce the susceptibility to LFM. In an embodiment of the invention the process also comprises cladding the Al—Mn alloy on at least one side with an AA4000-series or Al—Si brazing alloy optionally comprising up to 2.0% Zn. Cladding may for instance be performed by roll-bonding or any other known technique such as spray cladding or cast cladding.

The invention is also embodied in a sheet produced according to the process as described hereinabove, wherein the pre-braze elongation is at least 18%, preferably at least 19%, more preferably at least 21% and/or a pre-braze n-value of at least 0.270, and/or a post-brazing tensile strength of at least 140 MPa, preferably of at least 150 MPa. The elongation is measured over a gauge length of 80 mm, also denoted as A80.

In an embodiment of the invention the post-braze coupon SWAAT lifetime measured in terms of time to perforation in days and, when tested according to ASTM G85 A3, is at least 15 days, preferably at least 20 days without perforation. The low susceptibility to LFM is reflected in an improved resistance against corrosion in a formed heat exchanger component after brazing.

In an embodiment of the invention the sheet as described hereinabove is applied as a core in brazing sheet with or without a non-brazing liner or waterside liner alloy such as an AA7072, an AA1145 or an AA3005 or Al—Mn type alloys containing Zn in the range 0.5-5.0%, preferably in the range 0.5-2.5%, in folded tubes or for applications which are used under similar conditions. The requirements as to strength, formability, LFM susceptibility and corrosion resistance are particularly relevant for the application of the sheet as a core in a brazing sheet, for instance for application in heat exchangers utilizing folded tubes.

The sheet materials produced according to the process described hereinabove are particularly suitable for use as a core alloy in brazing sheet materials intended for manufacturing of components of tube-fin type heat exchangers such as radiators, heater cores and condensers, or for manufacturing of components of plate-fin type heat exchanger such as evaporator or oil cooler core plates or tanks of radiators or heater cores as a core alloy in brazing fin stock materials intended for manufacturing of components for heat exchangers.

A specific embodiment of the present invention will now be explained by the following non-limitative examples.

TABLE 1

Examples of alloys produced according to the invention (wt. %).

| Alloy | Cu | Fe | Si | Mn | Mg | Ti | Cr | Zr |
|---|---|---|---|---|---|---|---|---|
| 1 (reference) | 0.76 | 0.18 | 0.10 | 1.14 | 0.03 | 0.13 | <0.01 | <0.01 |
| 2 | 0.80 | 0.21 | 0.09 | 1.15 | 0.05 | 0.13 | 0.05 | 0.05 |
| 3 | 0.78 | 0.21 | 0.09 | 1.20 | 0.03 | 0.13 | 0.11 | <0.01 |
| 4 | 0.78 | 0.20 | 0.08 | 1.16 | 0.02 | 0.12 | 0.15 | <0.01 |

TABLE 1-continued

Examples of alloys produced according to the invention (wt. %).

| Alloy | Cu | Fe | Si | Mn | Mg | Ti | Cr | Zr |
|---|---|---|---|---|---|---|---|---|
| 5 | 0.72 | 0.20 | 0.07 | 1.21 | 0.01 | 0.14 | 0.08 | <0.01 |
| 6 | 0.76 | 0.15 | 0.08 | 1.19 | 0.01 | 0.12 | 0.06 | <0.01 |
| standard | 0.5-0.7 | <0.5 | <0.3 | 0.65-1.0 | <0.02 | 0.08-0.10 | — | — | other elements < 0.05 each and total <0.20, balance Al.

These alloys (alloys 1-4) were subjected to a homogenisation treatment at various temperatures for various times. Subsequently the alloys were clad on both sides with AA4045, 10% of the thickness on each side, followed by a preheat prior to hot rolling at various temperatures for various times, hot-rolling to 6.5 mm followed by an inter anneal at 350° C. for 3 hours, a first cold rolling to 2.3 mm, again followed by an inter anneal at 350° C. for 3 hours and a second cold rolling to a final gauge of 0.5 mm. The alloy was subjected to a recrystallisation annealing treatment to promote essentially full recrystallisation. To test the LFM behavior, the materials were stretched between 2 and 10%. The stretch level that showed the deepest penetration was used for the LFM data in Table 2.

Alloy 5 and 6 were clad on both sides with AA4045, 10% of the thickness on each side, followed by a preheat prior to hot rolling, and subsequently hot rolled to 3.5 mm and cold-rolled to 0.41 mm without inter annealing. After cold-rolling the material was subjected to a recrystallisation annealing treatment to promote essentially full recrystallisation. The LFM behavior was tested as described above. The results are presented in Table 2. The alloy designated 'standard' is an alloy which is used for LFM-critical applications.

In Table 2:

"+/−" means between 50 and 60% penetration of the core alloy thickness;

"+" means between 30 and 50% penetration of the core alloy thickness;

"++" means <30% penetration of the core alloy thickness.

Since the elongation usually shows significant scatter, the n-value can be used as an alternative indicator of formability.

An n-value of at least 0.270 indicates a good formability in view of the minimum strength requirement of at least 140 MPa. When compared to the standard alloy for LFM-critical applications, the alloys according to the invention, such as alloy 2-6 in Table 2, provide equal LFM-performance, but with significantly higher post-braze tensile properties.

TABLE 2

Examples of alloys produced according to the invention (2-4,5) and reference alloy (1).

| | Homoge | | pre-braze | | post-braze | | coupon SWAAT | |
| | Preheatnisation | | A80 | | 0.2 PS | UTS | days to | LFM |
| Alloy | °C./h | °C./h | % | n-value | MPa | MPa | perforation | resistance* |
|---|---|---|---|---|---|---|---|---|
| 1 | 610/8 | 430/24 | 17.4 | 0.264 | 60 | 133 | 26 | +/− |
| 2 | 610/8 | 430/24 | 21.2 | 0.276 | 69 | 152 | 38 | + |
| 3 | 610/8 | 490/24 | 19.4 | 0.296 | 63 | 155 | >40 | + |
| 3 | 610/8 | 490/2 | 19.4 | 0.286 | 66 | 152 | >40 | + |
| 3 | 610/24 | 430/24 | 21.7 | 0.285 | 61 | 153 | >40 | + |
| 3 | 580/12 | 430/5 | 19.5 | 0.300 | 68 | 156 | 37 | + |
| 3 | 580/12 | 490/2 | 22.2 | 0.304 | 62 | 152 | 35 | ++ |
| 3 | 550/12 | 490/24 | 18.6 | 0.307 | 66 | 157 | 22 | + |
| 3 | 550/12 | 490/2 | 24.5 | 0.300 | 65 | 159 | 29 | ++ |
| 4 | 610/8 | 430/24 | 21.1 | 0.277 | 70 | 153 | 33 | ++ |
| 5 | 610/10 | 430/1 | 24.0 | 0.282 | 61 | 155 | 24 | ++ |
| 6 | 610/10 | 430/1 | n.d. | n.d. | n.d. | n.d. | n.d. | ++ |
| stand. | | | n.d. | n.d. | 50 | 130 | n.d. | ++ |

(n.d. = not determined)

Another particular alloy which can be produced using the method according to the invention has the following compositional ranges, in wt. %:

Si 0.8-1.0, and typically about 0.9
Fe 0.25-0.4, and typically about 0.35
Cu 0.25-0.45, and typically about 0.40
Mn 0.55-0.9, and typically about 0.85
Mg 0.1-0.22, and typically about 0.15
Zn 0.06-0.10, and typically about 0.08
Cr 0.06-0.10, and typically about 0.08
Zr 0.06-0.10, and typically about 0.08,
balance aluminium and inevitable impurities.

The alloy can be used amongst others for tube plate, side supports and header tanks.

It is of course to be understood that the present invention is not limited to the described embodiments and examples described above, but encompasses any and all embodiments within the scope of the description and the following claims.

The invention claimed is:

1. Process for producing an Al—Mn alloy sheet with improved liquid film migration resistance when used as core alloy in brazing sheet, comprising the steps of:
casting a composition comprising (in weight percent):
0.5<Mn≦1.7
0.06<Cu≦1.5

Si≦1.3
Mg≦0.25
Ti<0.2
Zn≦2.0
Fe≦0.5
0.05<Cr≦0.12 and Zr<0.01,
other elements <0.05 each and total <0.20, balance Al.
homogenisation and preheat
hot rolling
cold rolling (including intermediate anneals whenever required), and wherein the homogenisation temperature is at least 450° C. for a duration of at least 1 hour followed by an air cooling at a rate of at least 20° C./h and wherein the pre-heat temperature is at least 400° C. for at least 0.5 hour.

2. Process according to claim 1, wherein the homogenisation temperature is between about 530° C. and 620° C. for between 1 to 25 hours, and wherein the pre-heat temperature is between about 400° C. and 530° C. for between 1 to 25 hours.

3. Process according to claim 1, wherein Si≦0.8%.

4. Process according to claim 1, wherein Si≦0.3%.

5. Process according to claim 1, wherein Si≦0.15%.

6. Process according to claim 1, wherein Mn is in between 0.7 and 1.4%.

7. Process according to claim 1, wherein 0.08<Cr≦0.12.

8. Process according to claim 1, wherein Mg≦0.15%.

9. Process according to claim 1, wherein Mg≦0.05%.

10. Process according to claim 1, wherein preferably Zn≦0.4%.

11. Process according to claim 1, further comprising cladding the Al—Mn alloy on at least one side with an Al—Si brazing alloy optionally comprising up to 2.0% Zn.

12. Process according to claim 1, further comprising cladding the Al—Mn alloy on at least one side with an Al—Si brazing alloy optionally comprising up to 2.0% Zn, and having a non-brazing liner alloys such as AA7072 or AA1145 or AA3005 or Al—Mn type alloys containing Zn in the range 0.5-5.0%.

13. Process according to claim 1, further comprising cladding the Al—Mn alloy on at least one side with an Al—Si brazing alloy optionally comprising up to 2.0% Zn, and having a non-brazing liner alloys such as AA7072 or AA1145 or AA3005 or Al—Mn type alloys containing Zn in the range 0.5-2.5%.

14. Process according to claim 1, further comprising V 0.05-0.25 wt. %.

15. Process according to claim 1, wherein the sum of Cr, Zr, and V is 0.05-0.25 wt. %.

16. Sheet produced according to claim 1, wherein the pre-braze elongation is at least 18%.

17. Sheet produced according to claim 1, wherein the pre-braze elongation is at least 19%.

18. Sheet according to claim 16, wherein the post-brazing tensile strength is at least 140 MPa.

19. Sheet according to claim 16, wherein the post-brazing tensile strength is at least 150 MPa.

20. Sheet according to claim 16, wherein the pre-braze n-value is at least 0.270.

21. Sheet according to claim 16, wherein the post-braze coupon SWAAT lifetime, when tested according to ASTM G85 A3, is at least 15 days without perforation.

22. Method of use of sheet produced according to claim 1, comprising combining the sheet as a core alloy with cladding to form a brazing sheet intended for manufacturing of components of tube-fin type heat exchangers such as radiators, heater cores and condensers.

23. Method of use of sheet produced according to claim 1, comprising combining the sheet as a core alloy with cladding to form a brazing sheet intended for manufacturing of components of plate-fin type heat exchanger such as evaporator or oil cooler core plates or tanks of radiators or heater cores.

24. Method of use of sheet produced according to claim 1, comprising combining the sheet as a core alloy with cladding to form brazing fin stock materials intended for manufacturing of components for heat exchangers.

25. Brazing sheet comprising the sheet according to claim 16, as a core alloy combined with cladding to form a brazing sheet intended for manufacturing of components of tube-fin type heat exchangers such as radiators, heater cores and condensers.

26. Brazing sheet comprising the sheet according to claim 16, as a core alloy combined with cladding to form a brazing sheet intended for manufacturing of components of plate-fin type heat exchanger such as evaporator or oil cooler core plates or tanks of radiators or heater cores.

27. Brazing sheet comprising the sheet according to claim 16, as a core alloy combined with cladding to form brazing fin stock materials intended for manufacturing of components for heat exchangers.

28. Process according to claim 1, wherein 0.72<Cu≦1.5.

29. Process according to claim 1, wherein 0.80<Cu≦1.5.

* * * * *